Nov. 13, 1934.   D. BARRERES   1,980,314
AUTOMOBILE WHEEL
Filed Dec. 22, 1931   2 Sheets-Sheet 1

Inventor
DOMINGO BARRERES

By *Georg L. McCathran*
Attorney

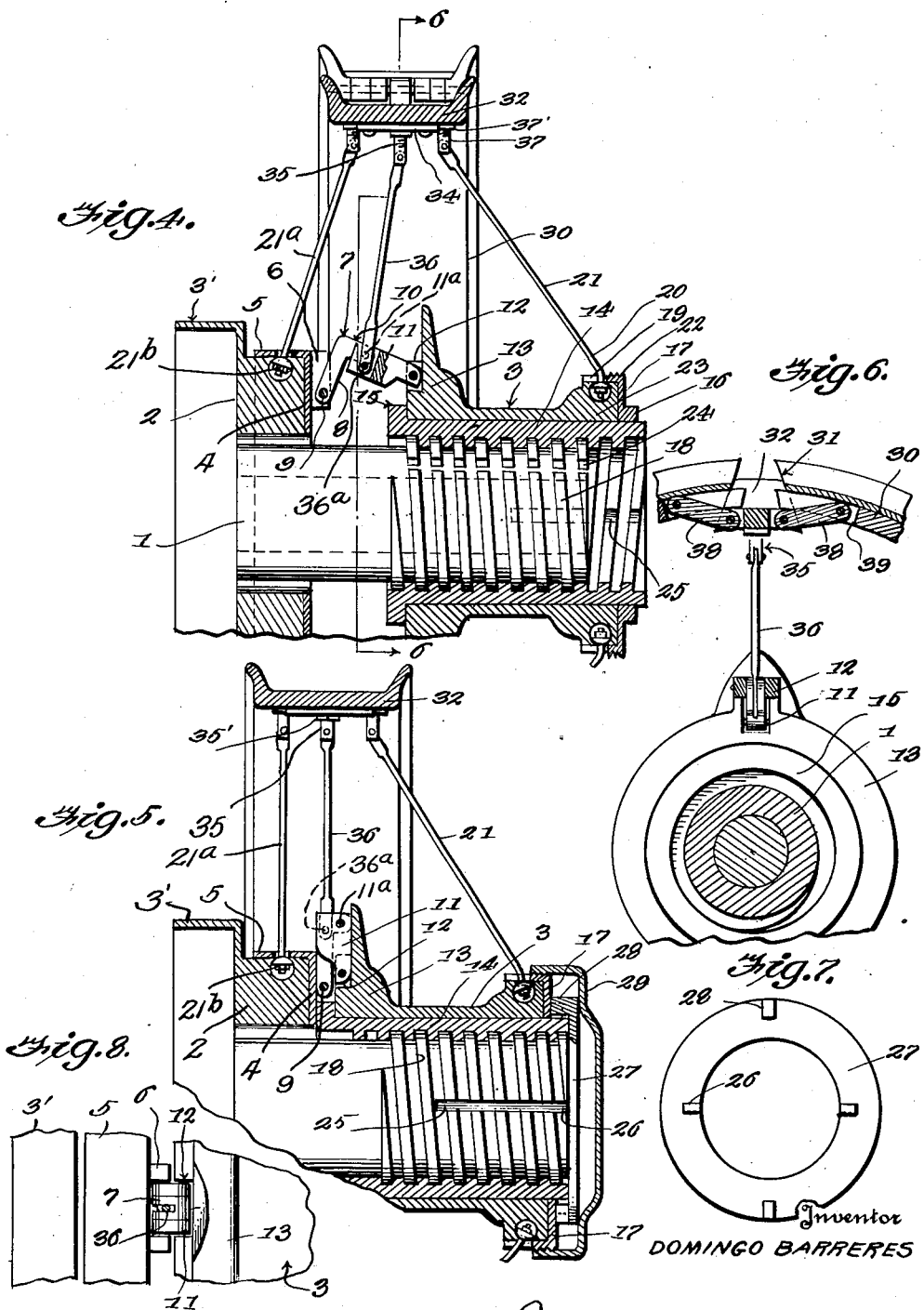

Patented Nov. 13, 1934

1,980,314

UNITED STATES PATENT OFFICE 1,980,314

AUTOMOBILE WHEEL

Domingo Barreres, New Britain, Conn., assignor of one-half to Antonio Cardona, New Britain, Conn.

Application December 22, 1931, Serial No. 582,581

7 Claims. (Cl. 301—16)

This invention relates to automobile wheels and has for its object the production of a simple and efficient means for contracting the rim of the wheel in such a manner as to facilitate the removal of the tire therefrom.

Another object of this invention is the production of a simple and efficient automobile wheel having a sectional rim which is so constructed in conjunction with the spokes thereof as to facilitate the contraction of the rim in such a manner as to permit the easy removal of a tire therefrom.

A still further object of the invention is the production of a simple and efficient automobile wheel of the wire spoke type which is so constructed as to connect the spokes between the rim and hub in such a manner as to permit the contraction of the rim for the purpose of easily removing a tire therefrom.

With these and other objects in view, this invention consists in certain novel constructions, combinations and arrangements of parts as will be hereinafter fully described and claimed.

In the drawings:

Figure 4 is a vertical section taken on line 4—4 of Figure 1;

Figure 5 is a section similar to that shown in Figure 4 with one of the expanding wedges in its expanded position;

Figure 6 is a section taken on line 6—6 of Figure 4;

Figure 7 is a plan view of the inner face of the key member used for holding the various parts in a locked position;

Figure 8 is a section taken on line 8—8 of Figure 2.

Figure 1:
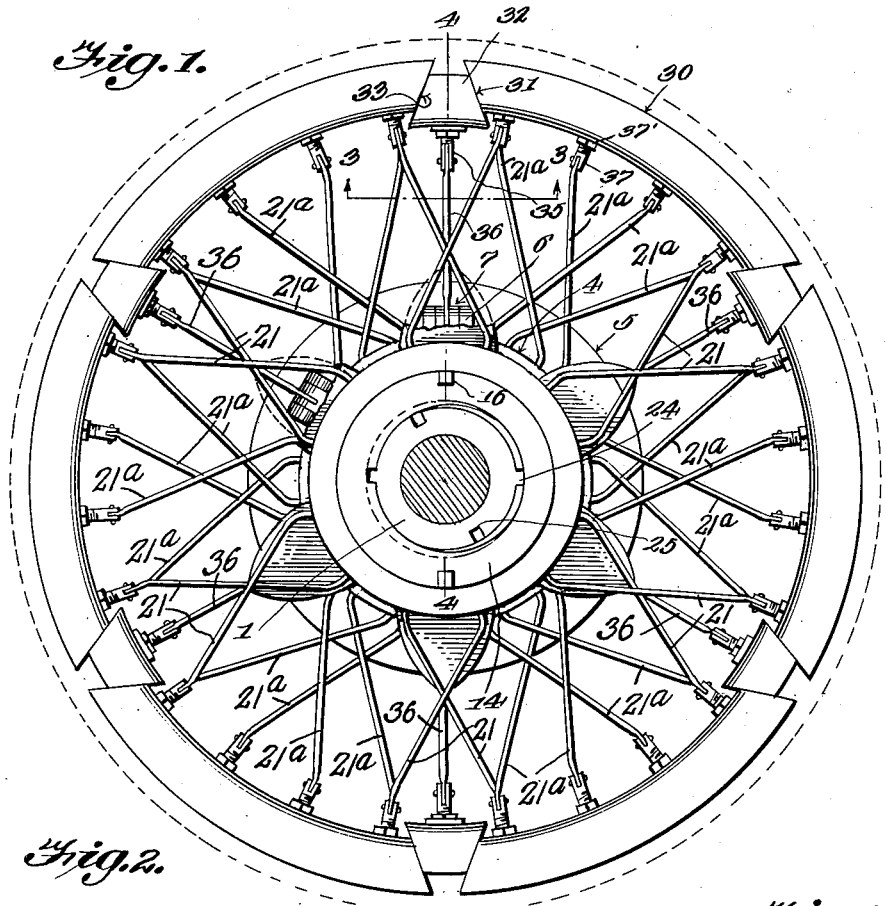
Figure 1 is a side elevation of my improved automobile wheel of the wire spoke type, showing the means employed for contracting the rim; the rim in this instance is shown in partly contracted position.
Figure 2:
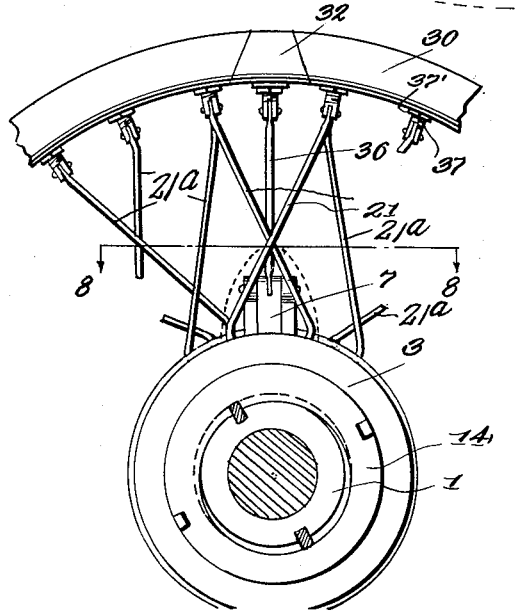
Figure 2 is a side elevation of a portion of the wheel showing one of the expanding wedges in position to expand the tire rim to its clinching position for the purpose of supporting a tire firmly thereon.
Figure 3:
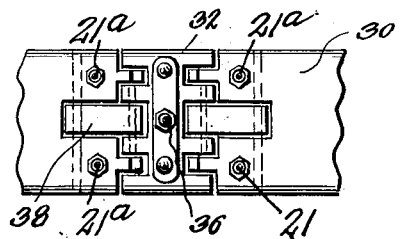
Figure 3 is a section taken on line 3—3 of Figure 1.

By referring to the drawings, it will be seen that 1 designates the hub sleeve upon which is mounted the primary hub section 2 and the auxiliary hub section 3. The primary hub section 2 carries the usual brake band 3' of suitable type, and to this primary hub section 2 is secured a suitable annular plate 4 having an annular flange 5, and this annular plate 4 is provided with a plurality of series of projecting ears 6, between which ears 6 are pivotally mounted the collapsible rocking levers 7. These collapsible rocking levers 7 are arranged at spaced intervals around the inner periphery of the primary hub section 2, as shown in Figure 1. Each collapsible rocking lever 7 comprises an angular arm 8 which is pivotally secured between the ears 6 as indicated at 9, and the side extension 10 of this angle arm is pivotally connected in the bifurcated end of the connecting link 11 by a pin 11$^a$. The forward end of each link 11 is pivotally connected between suitable spaced ears 12 formed upon the inner face of the annular flange 13 of the auxiliary hub section 3.

The auxiliary section 3 comprises a substantially tubular body having the flange 13 of annular construction, and this auxiliary hub section 3 is rotatably mounted upon an internally threaded sleeve 14, as shown clearly in Figure 4. The internally threaded sleeve 14 is provided with an annular flange 15 against which the inner end of the auxiliary hub section 3 abuts. The outer end of the internally threaded sleeve 14 is provided with a flange 16 which abuts against the spoke retaining plate 17 and holds the internally threaded sleeve 14 against independent longitudinal movement with respect to the auxiliary hub section 3 as will be obvious upon carefully considering Figure 4. This internally threaded sleeve 14 is threaded upon the externally threaded portion 18 of the hub sleeve 1, and by rotating this internally threaded sleeve 14, the auxiliary hub section 3 may be moved to or away from the primary hub section 2, for the purpose hereinafter described.

The outer plate 17, previously mentioned, is provided with suitable notches 19 for the purpose of receiving the shanks 20 of the spokes 21 and these spokes 21 are provided with suitable heads 22 which fit within the sockets 23 formed around the periphery of the outer end of the auxiliary hub section 3, as shown in Figure 4. In this way, the inner ends of the spokes 21 will be shielded and the spokes will in this manner be firmly held in engagement with the auxiliary hub sections 3. The spokes 21$^a$ leading from the rim sections adjacent the other side edges thereof are pivotally connected with the primary hub section 2 by joints 21$^b$. By this arrangement, the hub section 3 and rim sections may have movement relative to the hub section 2 and each other during expansion and contraction of the rim. The hub sleeve 1 is provided with longitudinally extending slots 24 formed in the threaded portion thereof and the inner threaded portion of the sleeve 14 is also provided with a plurality of longitudinally extending slots 25 formed in the thread, for the purpose of receiving the respective lugs 26 formed upon the key member 27. This key member 27 is preferably in the nature of a disc plate having the lugs 26 formed upon the inner periphery of the disc or annular ring 27 and these lugs 26 are adapted to fit in the registering slots 24 and 25 of the hub sleeve 1, and the sleeve 14, for holding the same against accidental relative movement. Suitable lugs 28 are also formed near the outer periphery of the key member or ring 27 which fits in the sockets 16 previously described to hold the ring in position. A sealing cap 29 is threaded upon the plate 17 to constitute a seal and hold the various parts in position.

In moving the sleeve 14 relative to the hub sleeve 1, a suitable tool will engage the notches 16, thereby permitting the sleeve 14 to be rotated with respect to the hub sleeve 1, and this hub sleeve 1 is preferably keyed to a suitable axle supporting the same. By means of the notches 16 and the operation of a suitable tool, the sleeve 14 may be adjusted longitudinally with respect to the hub 1 to move the expander wedge, hereinafter described to an expanding position, or to a releasing position.

As shown clearly in the drawings, the rim 30 comprises a plurality of similarly constructed sections which have their adjacent ends beveled to incline or taper toward each other, as indicated at 31. Between these inclined or beveled ends 31, fit the expander wedges 32, one wedge between the respective adjacent ends of the sections 30 of the rim of the wheel, as illustrated. Each expander wedge 32 is constructed to possess the same transverse area and contour as the rim sections 30. Each expander wedge 32 is also provided with tapering side walls 33 which abut against the side walls 31 of the rim sections 30, and as the expander wedges 32 are forced outwardly, the rim sections 30 will be spread apart thereby expanding the rim of the wheel and when these expander wedges 32 are contracted or retracted, the rim sections 30 will in turn be pulled inwardly in retracted position through the medium of the spokes 21 and 21ª, this movement being caused by the relative spreading apart of the primary hub section 2 and the auxiliary hub section 3, as previously explained. Each expander wedge 32 is provided with a plate 34 upon the inner face thereof to which is secured an adjustable lug 35, constituting a pivot for the inner end of the pulling rod 36, and which lug is locked in an adjusted position by means of the nut 35'. Each expander wedge 32 carries a pulling rod 36, and these pulling rods 36 are connected to the inner ends of the auxiliary section 11 of the collapsible lever 7 by a pin 36ª in transverse spaced relation to the pin 11ª, as shown in Figures 4 and 5. The outer ends of the spokes 21 and 21ª are pivotally connected to adjustable lugs 37 which project from the inner faces of the rim sections 30 adjacent opposite side edges thereof. These spokes extend diagonally between the hub and rim and, as previously explained, certain of the spokes are connected with the auxiliary hub section adjacent its outer end while others are connected with the primary hub section and the pull rods 36 for the wedges are pivoted to the levers 7 intermediate the length of the hub. The long spokes 21 are pivoted closer to the axis of the hub than the short spokes 21ª which are pivoted to the primary hub section and when the auxiliary hub section is slid longitudinally from the position of Figure 5 to that shown in Figure 4, the two sets of spokes swing towards each other as they swing towards the hub. At the same time, the pivot point 36ª for the inner end of the pull rod 36 moves diagonally towards the hub and pull will be exerted upon the pull rod to draw the wedge inwardly. It will thus be seen that the location of the pivot points relative to the axis of the hub and the manner in which the spokes swing relative to the hub and to each other permits the desired contraction of the rim. In order that these expanded wedges 32 may be held in proper position and prevented from dropping out of place, they are supported by suitable links 38 which are pivotally mounted within the bifurcations 39 formed near the respective ends of the rim sections 30, as shown clearly in Figure 6. A lock nut 37' is threaded upon each adjustable lug 37 for locking the lug in an adjusted position.

From the foregoing description, it will be seen that a very simple and efficient means has been provided for contracting or extending the expander wedges 32 by merely rotating the sleeve 14 upon the hub sleeve 1, shifting in this manner the auxiliary section 3 of the hub section with respect to the primary hub section 2. The collapsible lever 7, when the expander wedges 32 are forced to an expanding position, will assume the position shown in Figure 5, whereby the primary and auxiliary sections 8 and 11 will fold to extend in parallel relation, thereby extending the pull lever 36 to its fully extended position. As the hub section 3, and hub section 2, are expanded, the collapsible lever 7 will be unfolded so as to cause the auxiliary section 11 of the foldable lever to extend in substantially the same plane with the angle end 10 of the primary section 8 of the lever 7.

It should be understood that certain detail changes in the mechanical construction may be employed without departing from the spirit of the invention so long as these changes fall within the scope of the appended claims.

Having described the invention, what is claimed as new is:

1. A wheel of the class described comprising a hub section, a plurality of rim sections, expander means interposed between said rim sections, links for limiting the movement of said expander means with respect to said rim sections, and means connecting said hub sections together and engaging said rim sections for contracting and expanding said rim sections as said hub section is shifted.

2. A wheel of the class described comprising a hub sleeve, a primary hub section carried by said hub sleeve, an auxiliary hub section slidably mounted upon said hub sleeve, a plurality of rim sections, expander means interposed between the ends of said rim sections, means connecting said hub sections together, and means connecting said expander means with said last mentioned means for pulling said expander means inwardly as said auxiliary hub section is moved with respect to said primary hub section.

3. A wheel of the class described comprising a hub sleeve, a primary hub section carried thereby, said hub sleeve being provided with an externally threaded hub portion, an auxiliary hub section, an internally threaded sleeve engaging the externally threaded portion of said hub sleeve, said internally threaded sleeve supporting said auxiliary hub section and adapted to shift said auxiliary hub section to and from said primary hub section as said internally threaded sleeve is threaded upon the externally threaded portion of said hub sleeve, a plurality of rim sections constituting a rim, means connecting said rim sections to said primary and auxiliary hub sections whereby said rim sections will be contracted as said primary and auxiliary rim sections are spread apart, expander means interposed between the ends of said rim sections and means connecting said expander means to both of said hub sections movable in unison with said hub sections for moving said expander means into and out of a locking position as said hub sections are shifted relative to each other.

4. A wheel of the class described comprising a hub sleeve, a primary hub section secured thereto, an auxiliary hub section slidably mounted with respect to said primary hub section, a plurality of rim sections, spokes connecting said rim sections with said primary and auxiliary hub sections, a collapsible lever interposed between said primary and auxiliary hub sections for limiting the relative movement of said hub sections with respect to each other, expander means interposed between said rim sections, and a pull rod connected to said collapsible lever for pulling said expander inwardly as said hub sections are moved apart and forcing said expander outwardly as said hub sections are drawn together.

5. A wheel of the class described comprising a hub sleeve, a primary hub section secured thereto, an auxiliary hub section slidably mounted with respect to said primary hub section, a plurality of rim sections, spokes connecting said rim sections with said primary and auxiliary hub sections, a collapsible lever interposed between said primary and auxiliary hub sections for limiting the relative movement of said sections with respect to each other, expander means interposed between said rim sections, a pull rod connected to said collapsible lever for pulling said expander inwardly as said hub sections are moved apart and forcing said expander outwardly as said hub sections are drawn together, said collapsible lever comprising primary and auxiliary sections, said lever sections being connected to the respective primary and auxiliary hub sections, said collapsible lever being moved to an extended position when said expander is drawn inwardly and being folded to extend the primary and auxiliary sections of the collapsible lever in parallel relation when said expander is moved to an expanding position.

6. A wheel of the class described comprising a plurality of rim sections, expander wedges interposed between said rim sections, a primary and an auxiliary hub section, said auxiliary hub section movable away from and toward said primary hub section, spokes engaging said expander wedges and other spokes engaging said rim sections, and links pivotally connecting the inner ends of the spokes of said expander wedges to said auxiliary hub section whereby said last mentioned spokes will be pulled inwardly as said auxiliary hub section is moved away from said primary hub section.

7. A wheel of the class described comprising a plurality of rim sections, expander wedges adapted to fit between said rim sections for holding the same in an expanded position, spokes engaging said expander wedges, other spokes engaging said rim sections, a primary hub section, an auxiliary hub section, means for facilitating the shifting of said auxiliary hub section away from and toward said primary hub section, links pivotally connecting said auxiliary hub section to the inner ends of the spokes of said expander wedges for forcing said spokes outwardly toward said rim sections and expanding said rim sections and moving said expander wedges outwardly, as said auxiliary hub section is moved toward said primary hub section and contracting said expander wedges and said sections as said auxiliary hub section is moved away from said primary hub section.

DOMINGO BARRERES.